United States Patent [19]
Edens

[11] Patent Number: 5,182,119
[45] Date of Patent: Jan. 26, 1993

[54] APPARATUS FOR PRODUCTION OF FREE FLOWING POLYTETRAFLUOROETHYLENE (PTFE) MOLDING PELLETS

[75] Inventor: William L. Edens, Bala Cynwyd, Pa.

[73] Assignee: ICI Americas, Inc., Wilmington, Del.

[21] Appl. No.: 904,907

[22] Filed: Jun. 25, 1992

Related U.S. Application Data

[63] Continuation of Ser. No. 687,135, Apr. 18, 1991, abandoned.

[51] Int. Cl.⁵ .............................................. B29C 67/00
[52] U.S. Cl. .................................... 425/222; 264/117
[58] Field of Search ......................... 264/117; 425/222

[56] References Cited

U.S. PATENT DOCUMENTS

| | | | |
|---|---|---|---|
| 2,127,137 | 8/1938 | Price | 259/3 |
| 2,164,164 | 6/1939 | Price | 134/60 |
| 2,187,601 | 1/1940 | Glaxner | 134/60 |
| 2,213,056 | 8/1940 | Skoog | 259/9 |
| 2,243,384 | 5/1941 | Lehrecke | 259/3 |
| 2,674,522 | 4/1954 | Takewell | 23/314 |
| 2,786,232 | 3/1957 | Larson et al. | 425/222 |
| 2,828,190 | 3/1958 | King | 425/222 |
| 2,834,044 | 5/1958 | Antonsen | 18/1 |
| 2,889,575 | 6/1959 | Larson et al. | 425/222 |
| 2,890,942 | 6/1959 | Webster et al. | 425/222 |
| 3,126,577 | 3/1964 | Loewen | 18/1 |
| 3,227,789 | 1/1966 | Tytus et al. | 425/222 |
| 3,636,188 | 1/1972 | Driscoll | 425/222 |
| 3,942,930 | 3/1976 | Whitehead | 425/222 |
| 4,050,869 | 9/1977 | Takewell | 425/222 |
| 4,373,893 | 2/1983 | Barber | 425/222 |
| 4,411,612 | 10/1983 | Holland | 425/222 |
| 4,980,106 | 12/1990 | Vogel | 264/102 |
| 4,997,357 | 3/1991 | Eirich | 425/144 |
| 5,033,405 | 7/1991 | Yamada et al. | 425/222 |

Primary Examiner—Jay H. Woo
Assistant Examiner—Scott Bushey
Attorney, Agent, or Firm—Thomas J. Greer, Jr.

[57] ABSTRACT

An apparatus and process for the production of agglomerated pellets from a polytetrafluoroethylene (PFTE) resin powder. Such agglomerated pellets are commonly used in molding apparatus. The pellets of this invention exhibit better and more consistent flowability and higher, more consistent bulk density than those made by previously known apparatus and methods. The apparatus includes a tilted, heated polygonal tube provided at its discharge end with an apertured plate.

7 Claims, 5 Drawing Sheets

APPARATUS FOR PRODUCTION OF FREE FLOWING POLYTETRAFLUOROETHYLENE (PTFE) MOLDING PELLETS

This is a continuation of copending application Ser. No. 07/687,135 filed on Apr. 18, 1991, now abandoned.

BACKGROUND OF THE INVENTION

This invention relates to the art of agglomeration and more particularly to the formation of pellets from a resin in the form of a non free flowing powder of polytetrafluoroethylene (PTFE) and other polymers and copolymers.

In the molding of various plastic articles, it is customary to feed or stock the mold by pellets. The pellets include a base resin, such as polytetrafluoroethylene, together with various fillers, colorants and the like which are desired in the final molded product.

It has been a continuing problem to convert PTFE in the relatively low bulk density and low flow powder forms available from resin manufacturers to a high density free flowing agglomerated pellet that will rapidly and easily feed to modern automatic molding machines. This is accomplished by use of a wetting agent (e.g. trichloroethylene, alkyl alcohols, water soluble alcohols plus water or the like) to wet the low bulk density, non free flowing PTFE polymer, followed by various forms of rolling or tumbling of the wet polymer to promote agglomeration with accompanying bulk density increase. Known agglomerating apparatus and methods include double cone blenders and inclined pans or discs to convert the powder forms of PTFE to pellets. The agglomerated pellets are then dried and/or baked with or without solvent recovery.

Another apparatus/method has also been used, prior to this invention, for PTFE resin agglomeration. The polymer from a resin manufacturer (e.g. Teflon 7A or Teflon 7C from DuPont or G170, formerly G570, from ICI) is wetted with ethanol containing 5%-10% water after blending with desired additives (e.g. glass, bronze, various fillers, carbon black, etc.) and mixed in a blender to thoroughly and uniformly wet the polymer. The wetted polymer is fed through a screen type hammer mill to form an initial pellet. These seed pellets are then fed into a slightly tilted, heated octagonal stainless steel tube (10 feet long by 14¼ inches across opposite flats) which is rotating at 10-40 rpm. Agglomeration of the seed pellets occurs over the 1-2 minute contact time as they pass through the tube. The tube is heated to prevent major sticking of the wet pellets to the walls of the tube and the tube is inclined from 0.1 to 6 degrees to cause essentially plug flow through the tube. The agglomerated pellets are then tray dried with solvent recovery and baked for up to 12 hours at up to 610 F. (321 C.) to further densify the pellet.

In use of this latter apparatus/process over several years, problems have been encountered in making consistent pellet products, particularly with respect to pellet flowability.

Flowability of agglomerated automatic molding products (pellets) is measured by a slit flow test, known in this art. Pelletized PTFE (both virgin and filled) is placed into a triangular hopper apparatus. When the hopper apparatus is actuated, one side of the hopper gradually moves (as in the manner of a sliding gate), thus defining a slit in the bottom of the hopper. This opening increases in size until about 50 grams of pellets have fallen through and into a pan. The same weight of pellets, which exhibit better flowability, will fall through a smaller slit opening. The slit width is used as an indicator of how well the pellet material will fill mold cavities at plastic article fabricators. Variations in pellet flowability are typical of most free flow products made by this process.

A study to determine causes for this variation was conducted. This study included a review of a small scale sample preparation unit using an inclined unheated rotating disc in place of the heated, octagonal tube in the larger scale unit. The significant observations of this process were:

(1) The product was improved over the large scale process in slit flow and in bulk density and reproducibility.

(2) The type of rolling action was different from that in the octagonal rotating tube process.

(3) The residence time in the rotating disc unit was 2-5 minutes normally, while it was much less in the octagonal tube unit.

Studies were then conducted on a large scale rotating octagonal tube to increase residence time (e.g. lower tube angle, higher tube speeds, lower feed rates, etc.). No significant improvement in level or reproducibility of slit flow and bulk density was obtained in spite of increased residence time to that of a small scale rotating disc unit.

An apertured plate or disc at the discharge end of the octagonal tube was then installed to determine if the disc would improve the rolling action in the tube, to be more like that of the rotating disc agglomerating apparatus. Unexpectedly and surprisingly the disc acted like a friction or hydraulic clutch to generate a motion essentially throughout the length of the octagonal tube, analogous to an ocean wave of the pellets rolling over themselves. Several sized openings in the disc at the end of the rotating tube were tried and evaluated. With a smaller opening, pellet flowability increased and bulk density increased, giving this process the capability of varying both slit flow and bulk density to suit various end use requirements by changing the size of the end plate opening. For a plate of about 18 inches square, round openings in the plate of 7, 9, 11, 11.5 and 13 inches were used.

SUMMARY OF THE INVENTION

According to the practice of this invention, significantly improved results in the formation of plastic pellets by agglomeration from PTFE resin powders is realized by the addition of an apertured plate at the discharge end of a rotary tube type agglomerating apparatus. The tube may be heated or unheated, although best results have thus far been obtained with heated tubes. The tube is polygonal (octagonal in several tests) although other shapes yield the similar results. It is believed that these improvements (slit flow and bulk density, as well as consistency of both slit flow and bulk density) result from the wavelike rolling action of the pellets in conjunction with increased dwell or residence time of the pellets in the rotary tube.

DETAILED DESCRIPTION OF THE INVENTION

Figure 1:
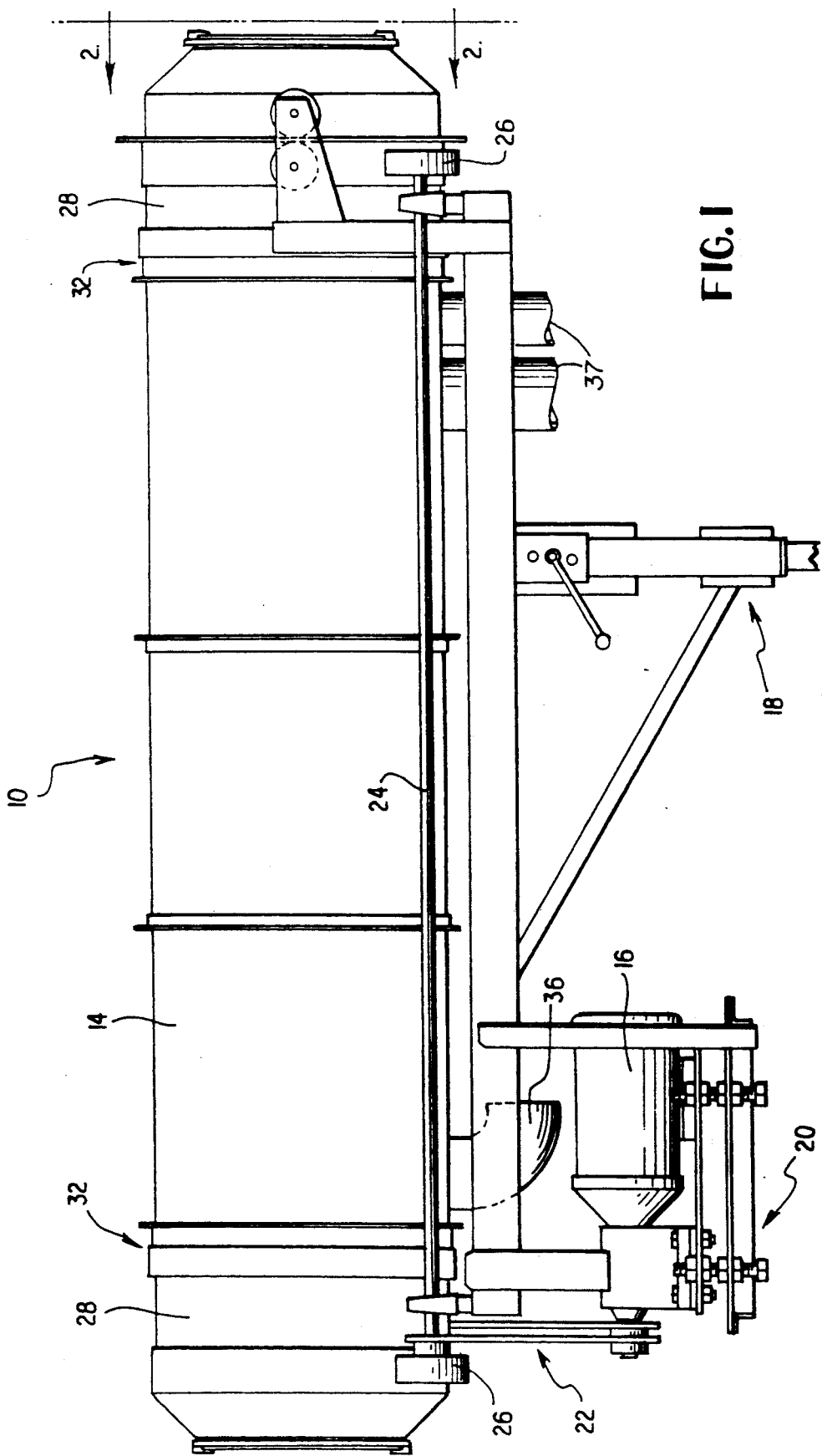
FIG. 1 is a side elevational view illustrating a typical prior art type rotating drum, the drum being provided with an apertured plate or disc at its discharge end.
Figure 2:
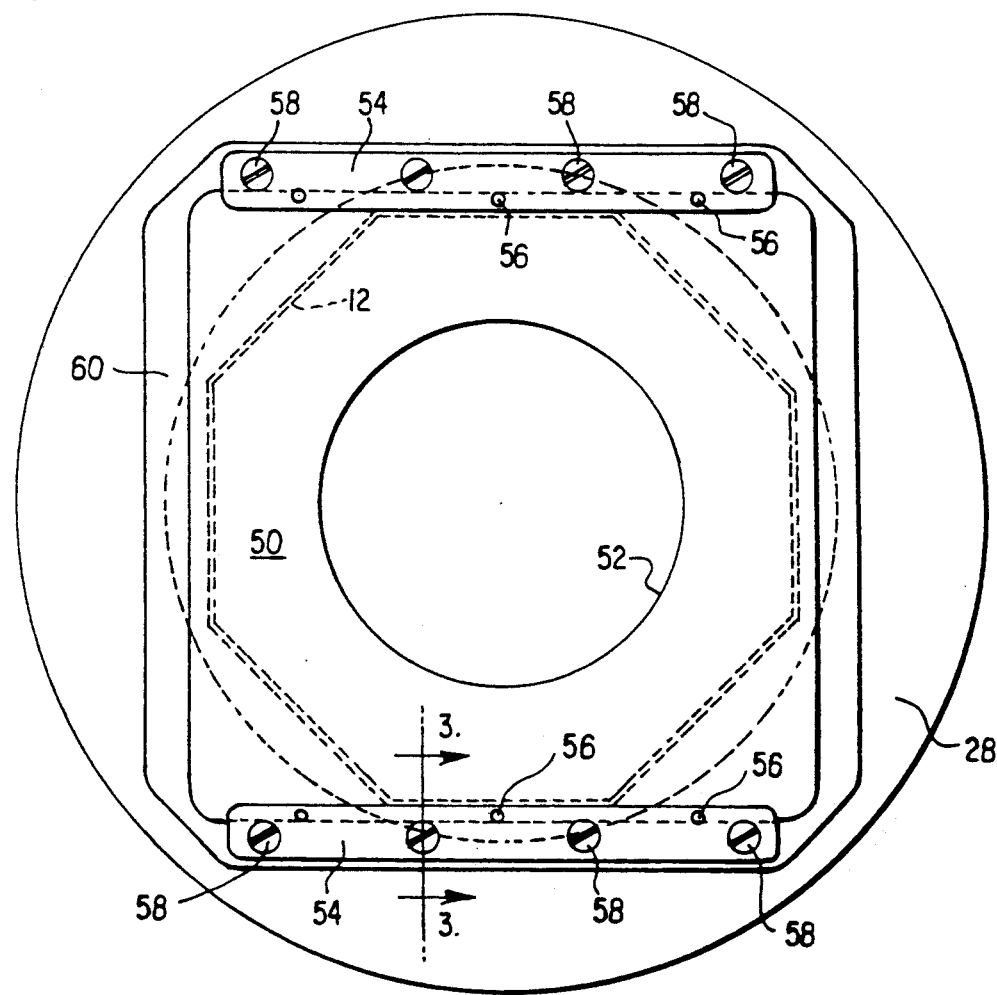
FIG. 2 is an end view taken along 2—2 of FIG. 1.
Figure 3:
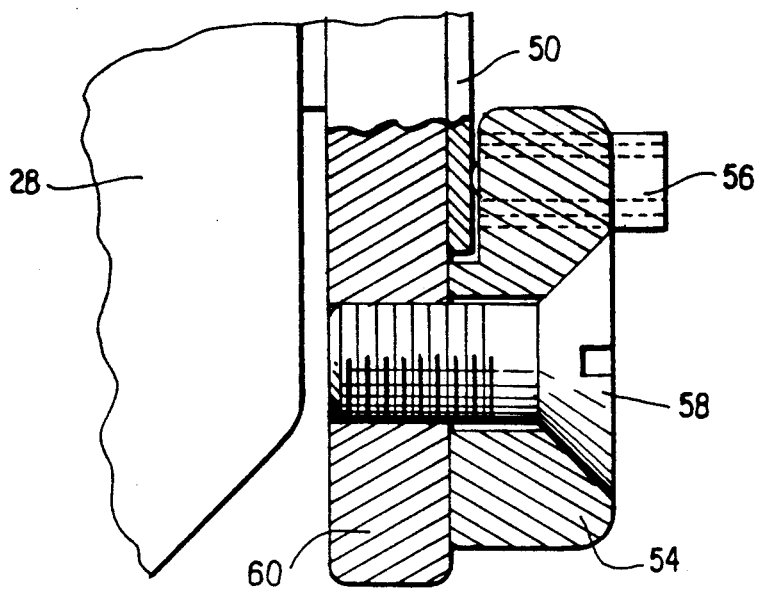
FIG. 3 is an enlarged view, taken along section 3—3 of FIG. 2, of the discharge end of the rotating drum of FIG. 1.

Referring now to FIGS. 1-3 of the drawings, the numeral 10 denotes generally the pelletizing apparatus of this invention and includes a rotary, octagonal, elongated tube 12 (see FIG. 2) surrounded by a stationary, annular heating jacket 14, the tube being rotated by a motor 16. There are no baffles within tube 12. Base members designated generally as 18 and 20 support the assembly. One of the base members may be vertically adjustable to vary the tilt of the tube. A belt and pulley arrangement denoted generally as 22 transmits the rotary motion of the motor to a shaft 24. The shaft is located parallel and to one side of jacket 14, the shaft carrying drive discs 26 at both ends. The drive discs each frictionally contact annular shrouds 28, the shrouds fixed to the ends of tube 12. Rotary seals 32 at the ends of jacket 14 engage the wide, inner ends of shrouds 28 to inhibit escape of hot air, the hot air being fed from an external source through ducts 37 into jacket 14 to heat tube 12. Exit ducts are designated as 36. However, the direction of air flow within the jacket can be reversed.

The particle size of the PTFE powder resin fed into the left, elevated end of tube 12 is typically 30 microns (median particle size), but not usually greater than 100 microns while the final product of agglomerated pellets is typically 200-1000 microns (median particle size).

The discharge end of tube 12, surrounded by one of the shrouds 28, is provided with a plate 50 having a centrally disposed circular opening 52 therein. As shown at FIGS. 2 and 3, the plate is generally rectangular and is releasably clamped by a plurality of spring urged bolts 56 at the plate upper and lower edges. Bolts 56 are mounted in rectangular bars 54, the latter fastened to rim 60 of shroud 28 by threaded fasteners 58. As may be seen at FIGS. 1 and 3, a plane containing plate 50 lies outside of the interior of rotary tube 12.

In operation, PTFE resin powder, in the same form as received from a manufacturer, and typically mixed with additives, colorants, fillers of various types, is fed into the left, upper input end of rotating tube 12. Jacket 14 is heated by hot air, the hot air being fed into either end of the jacket. The inlet air temperature is typically in the range 250-400 F., and the air outlet temperature is typically in the range 200-350 F.

Figure 4:
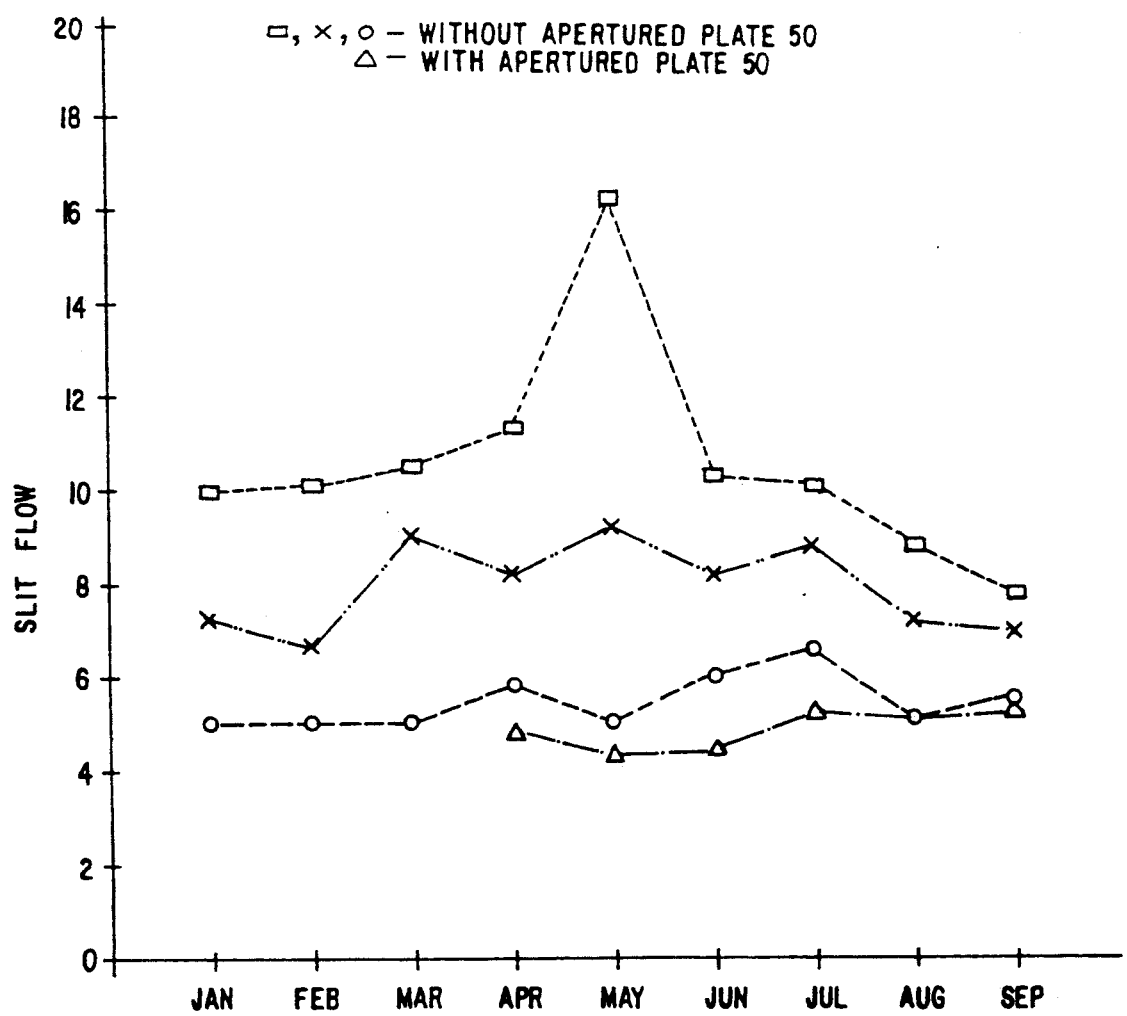
FIG. 4 is a graph showing the variation in slit flow of PTFE pellets, for a heated rotary tube, both with and without the apertured disc or plate of this invention.

Referring now to FIG. 4 of the drawings, the decrease in slit flow number (better flowability) measured over a period of months for a PTFE compound including glass and graphite, is illustrated. The lowermost curve (triangles) illustrates the average slit flow number, taken over a period of months, when the agglomerated pellets are produced using the plate of this invention. The three upper curves represent the slit flow numbers of agglomerated pellets produced without the apertured plate of this invention. In these three upper curves, the circles represent the minimum slit flow for a single batch from about 5-15 batches during the particular month indicated. The X's represent the average slit flow of all the batches produced during the particular month indicated. The rectangles represent the maximum slit flow for a single batch during that particular month indicated.

Figure 5:
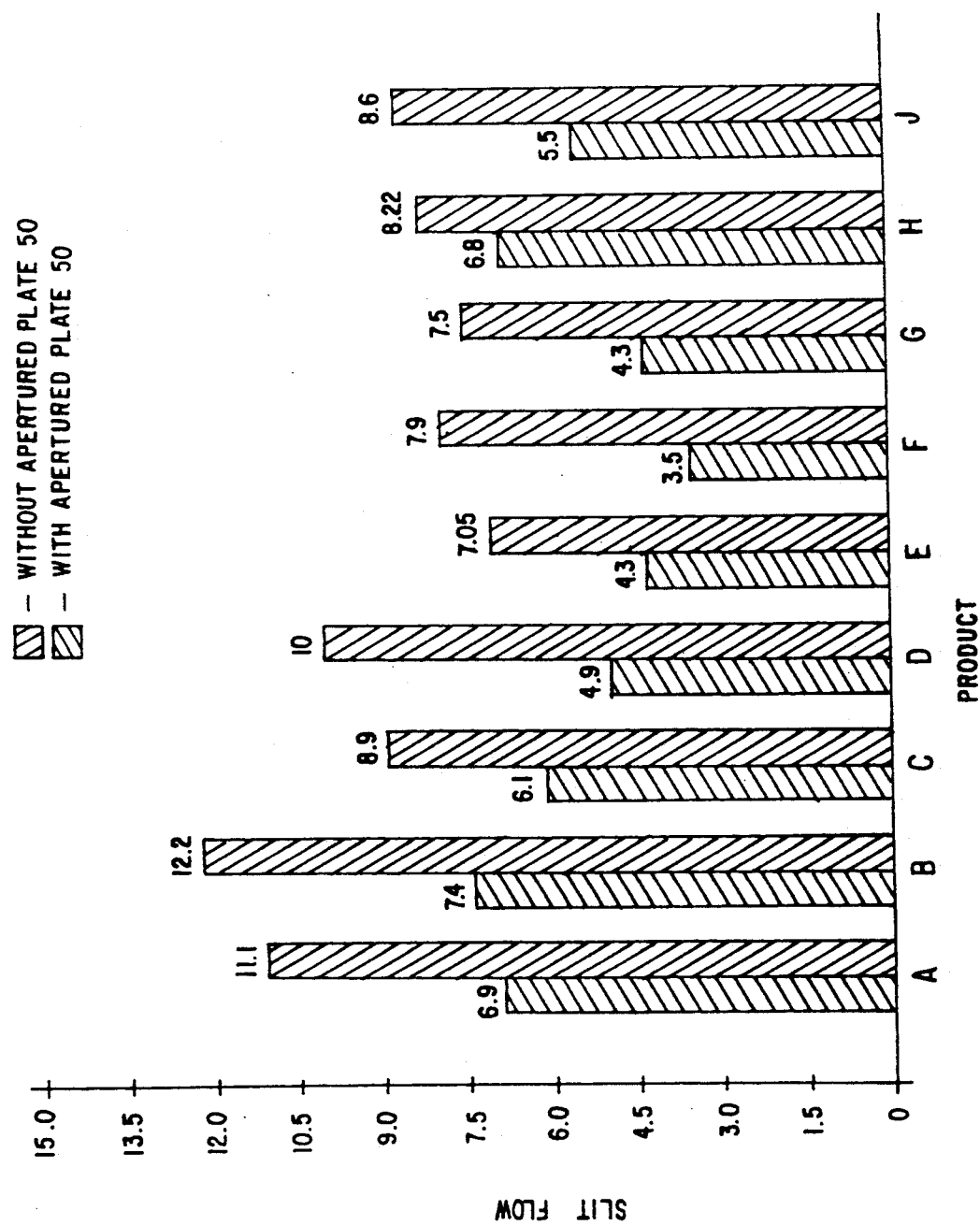
FIG. 5 is a bar chart showing the improvement in slit flow of PTFE pellets formed using the apertured disc of this invention with a heated rotary tube.

FIG. 5 also illustrates the improvement (lessening) of slit number achieved with the use of the apertured plate of this invention. The two vertical bars of each touching pair of bars represent the average slit flow number for agglomerated PTFE powdered resins produced by agglomeration in a rotating, heated tube without internal baffles. Each pair of bars is designated by a letter, with each letter representing a particular PTFE composition. The highest bar of each pair of bars represents the slit flow number without the apertured plate 50 at the discharge end of the (heated) rotating tube, while the shortest bar of each pair represents the slit flow number with the plate 50 at the discharge end of the rotating tube.

The compositions A, B, etc. of FIG. 5 were as follows:

|  | WT. % |
| --- | --- |
| (A) | |
| Teflon 6264 | 40.0 |
| Molybdenum Sulfide | 5.0 |
| Bronze Powder | 55.0 |
| (B) | |
| Teflon 7C | 45.0 |
| Teflon L-129 | 39.0 |
| Orange Pigment Filler | 16.0 |
| (C) | |
| Teflon 7C | 25.0 |
| Fluon G570 | 50.0 |
| <200 Mesh Sifted Glass Fibers | 23.5 |
| Colorants & Silica | 1.5 |
| (D) | |
| Teflon 7C | 45.0 |
| Teflon L-129 | 39.0 |
| PTFE Lubricant | 0.5 |
| Filler & Pigment | 15.5 |
| (E) | |
| Teflon L-129 | 65.26 |
| Teflon 7C | 13.50 |
| Baked & Sifted Glass Fibers | 15.82 |
| Yellow Pigments | 5.42 |
| (F) | |
| Teflon L-129 | 76.5 |
| <200 Mesh Sifted Glass | 23.0 |
| Black Pigments | 0.5 |
| (G) | |
| Teflon 7C | 20.4 |
| Teflon L-129 | 53.8 |
| Sifted <200 Mesh Glass Fibers | 25.0 |
| Red Pigment | 0.8 |
| (H) | |
| Teflon 7C | 44.5 |
| Teflon L-129 | 39.5 |
| Teflon TE-9050 | 0.5 |
| Baked and Sifted Glass Fibers | 14.5 |
| Green Pigments | 1.0 |
| (J) | |

| | WT. % |
|---|---|
| Teflon L-129 | 62.9 |
| Teflon 7-C | 20.0 |
| Sifted & Baked Glass Fibers | 16.0 |
| Blue Pigment | 0.6 |
| Silica | 0.5 |

The Teflon material is obtained from DuPont.

The exact nature of the compositions A, B, etc. plays no role in the invention. FIG. 5 is given only to demonstrate the improvement in flowability of agglomerated PTFE pellets resulting from the addition of apertured plate or baffle 50 to the end of tube 12 in a rotating tube type of agglomerating apparatus.

Figure 6:
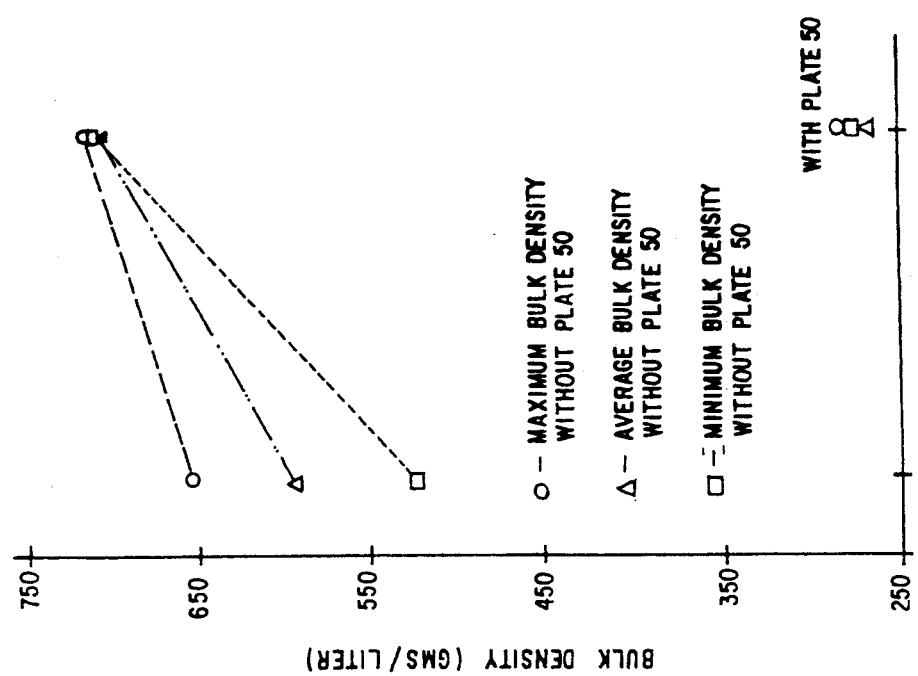
FIG. 6 is a graph showing the changes in both bulk density and bulk density consistency in making agglomerated PTFE pellets with the apertured plate of this invention, with a heated rotary tube.

FIG. 6 illustrates the improvement in bulk density and bulk density consistency, for a heated rotary tube, realized by the apertured plate of this invention. The left three points represent (from the top down) the maximum, average, and minimum bulk density values for agglomerated pellets formed from a PTFE compound containing graphite and carbon black, without the apertured plate of this invention. The right points, very nearly coincident, correspond to the bulk density for the same pelletized PTFE compound when the apertured plate of this invention is used. Not only is the bulk density increased with apertured plate 50, the bulk density is also more consistent in value.

Figure 7:
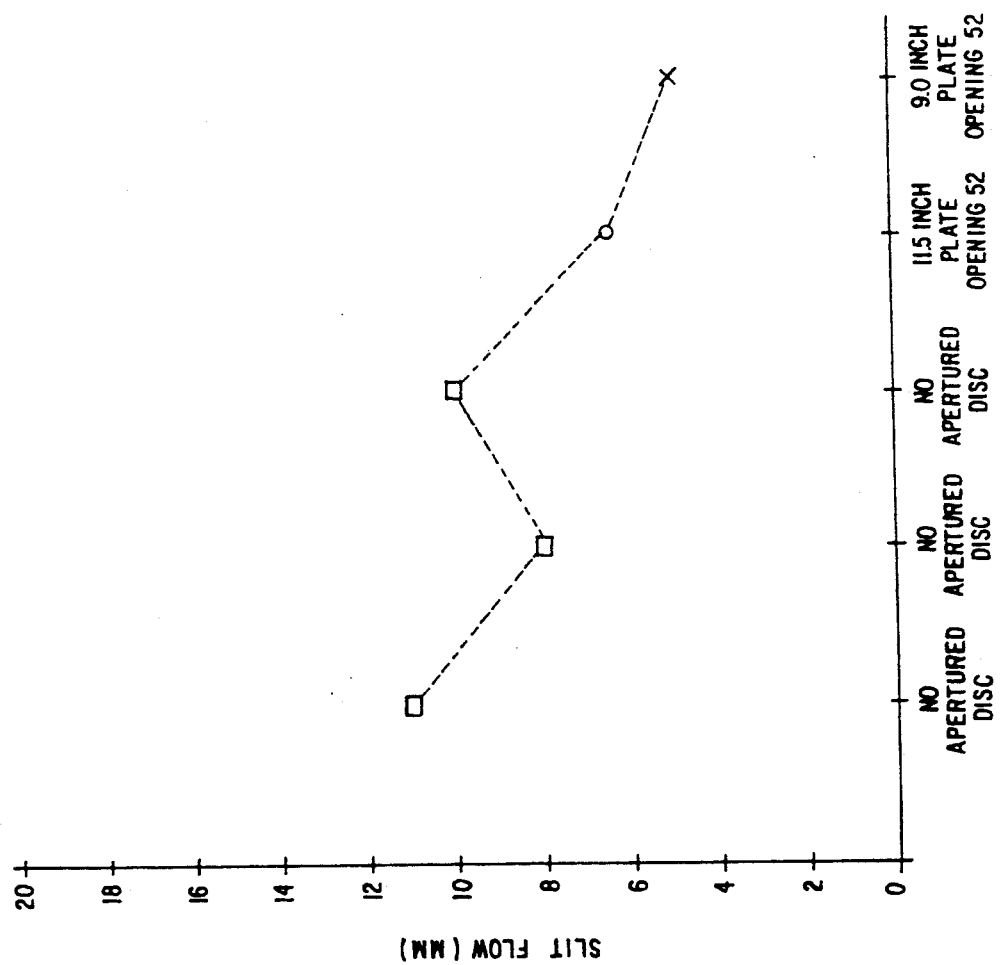
FIG. 7 is a graph showing the improvement in pellet flowability, for an unheated tube, enjoyed by the use of the apertured disc or plate of this invention.

FIG. 7 illustrates flowability, as measured by the parameter slit flow, for an unheated rotary tube, for a PTFE compound containing PTFE resin of about 85% and about 15% glass fibers. The left three points (squares) represent slit flow with no apertured disc in the tube discharge end, the second point from the right (a circle) representing slit flow with an 11.5 inch opening 52 in plate 50 of FIGS. 1–3, while the right point (an X) represents slit flow with a smaller opening 52 (9 inches) in the disc.

It will be understood that the particular form of the rotating drum apparatus 10 (without the apertured plate 50) is not critical for the practice of the invention, many of known rotary agglomerating tube constructions being suitable.

It will be recognized that the plate or disc 50 may be of various shapes and sizes. A cone-shaped piece has been used and similar results have been obtained. It is also obvious that the tube 12 transverse cross sectional shape (circular, octagonal), can be varied, as well as tube rotary speeds, temperatures, tilt angles, etc.

Prior to the use of an apertured disc in the discharge end of a rotary tube agglomerating apparatus, certain base PTFE resin powders could not be used to make acceptable free flow pellet products. This was because some methods employed in grinding the base PTFE resin resulted in very fibrous, low bulk density powder which was difficult to form into a smooth, free flowing pellet agglomerate. With the use of the disc, it has been possible to make a wide spectrum of free flow products with PTFE powders which are relatively fibrous in nature as well as powders which are relatively smooth.

I claim:

1. An apparatus for the production of agglomerated PTFE molding pellets made from a powder PTFE resin, the apparatus including a rotary tube of predetermined length having a longitudinal axis and having an interior between an inlet end and an outlet end, the endmost region of the outlet end of said rotary tube provided with an apertured plate, said plane being mounted in a plane lying outside of the interior of said rotary tube the aperture of said plate and said outlet end of the rotary tube both being unobstructed, said outlet end provided with means to releasably affix said apertured plate to said outlet end, whereby plates having various aperture sizes may employ in the apparatus and wherein the apertured plate may be changed without entering the interior of the rotary tube.

2. The apparatus of claim 1 wherein at least a portion of the length of the tube is heated.

3. The apparatus of claim 1 wherein the tube is polygonal in transverse cross section.

4. The apparatus of claim 1 wherein the plate is apertured by an opening substantially colinear with the axis of the rotary tube.

5. The apparatus of claim 1 wherein the tube is tilted to the horizontal.

6. The apparatus of claim 1 wherein said means releasably affixes said apertured plate to said outlet end by releasably clamping at least a periphery of the apertured plate.

7. The apparatus of claim 1 wherein the interior of said rotary tube is free of baffles.

* * * * *